M. K. DUNHAM.
TIP FOR WELDING TORCHES.
APPLICATION FILED JAN. 18, 1919.
1,330,522. Patented Feb. 10, 1920.
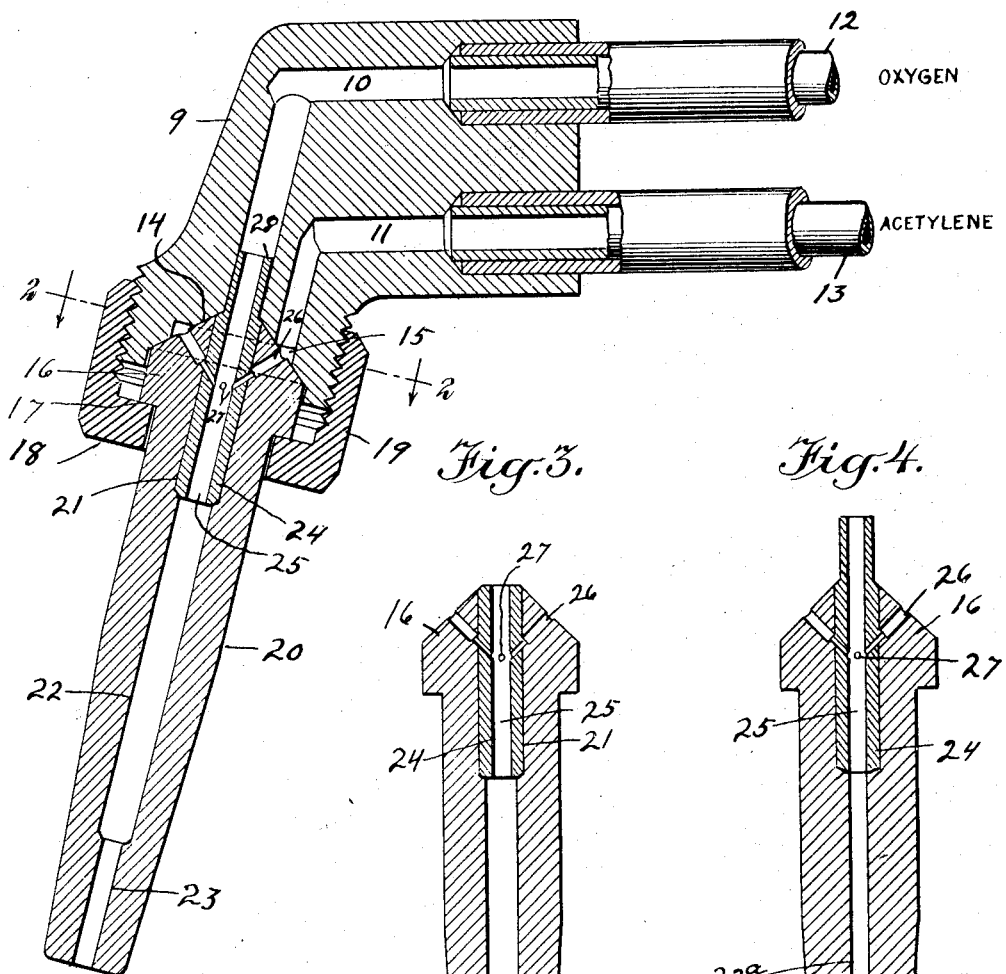
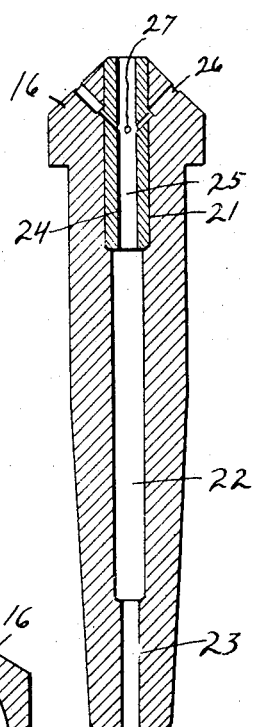
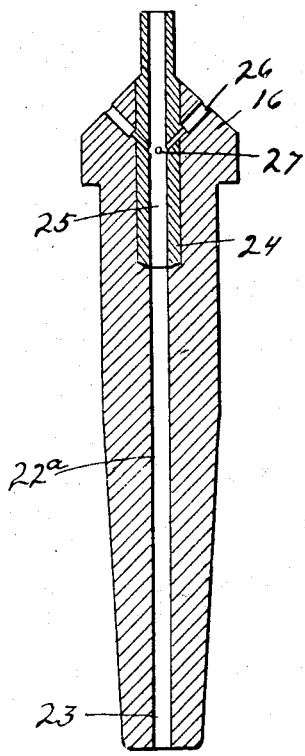
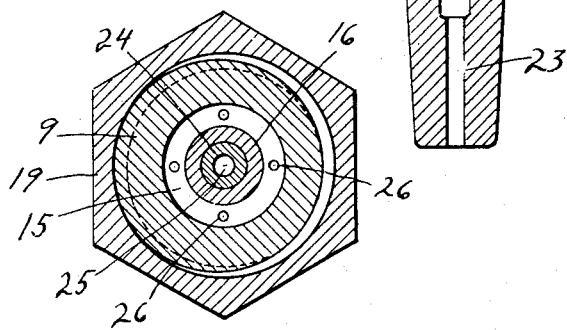
Inventor
Melbourne Keith Dunham
By his Attorney

UNITED STATES PATENT OFFICE.

MELBOURNE KEITH DUNHAM, OF CHICAGO, ILLINOIS, ASSIGNOR TO THE BASTIAN BLESSING CO., OF CHICAGO, ILLINOIS, A CORPORATION OF ILLINOIS.

TIP FOR WELDING-TORCHES.

1,330,522.   Specification of Letters Patent.   Patented Feb. 10, 1920.

Application filed January 18, 1919. Serial No. 271,813.

*To all whom it may concern:*

Be it known that I, MELBOURNE KEITH DUNHAM, a citizen of the United States, and a resident of Chicago, in the county of Cook and State of Illinois, have invented certain new and useful Improvements in Tips for Welding-Torches, of which the following is a specification.

If the mixing chamber of a welding torch is a great deal smaller than the flame exit, the pressures required to operate the tip must be undesirably high in order that the velocity of the gases will still be sufficiently high at the larger outlet to prevent flashback. If the mixing chamber be considerably larger than the tip outlet, then the desired velocity in the larger mixing chamber cannot be maintained without such a high velocity at the tip that the flame will blow away or cannot be lighted. Therefore the outlet and the mixing chamber should be of about the same cross sectional area although some variation is permissible. For these reasons, it is obvious, therefore, that merely as a mechanical expedient it is desirable to have an interchangeable mixing chamber preferably integral with and within the tip, if any wide variation in the size of tip outlets is to be employed so that each tip may have its own mixing chamber accurately and definitely proportioned to its flame exit.

For large tip sizes it is usually possible to drill a passage through the full length of the tip, the portion or section of such passage at or near the inner end of the tip serving as the mixing passage. With the smaller tip sizes, it is very difficult, if not impossible, to drill such a long, small passage properly positioned due to the flexibility and breakage of the small drills and character of the material of which the tips are usually made. In order to secure a more intimate mixture of the gases and reduce their velocity while in the body of the tip, it is desirable in many instances to make this body or intermediate portion of the passage a little larger than either the outlet or the mixing chamber. To accomplish this, it has been proposed to make the tip in two pieces, the upper half from brass which may be easily machined and drilled with the small holes necessary in oxy-acetylene torch construction. It is preferable to use copper or alloys very high in copper, Monel metal, or similar metal, or composition having a high melting point, a high degree of heat conductivity, or both, in order to avoid the easy destruction of the tip which is subjected to rather high temperatures at times. Copper, Monel metal, etc., is difficult to drill accurately for long distances, and it has been proposed to make the tip in two pieces of approximately equal lengths, reaming both pieces from the joint so that the points where they are put together by a screw thread or other means will have the largest diameter of the hole. This method is open to severe criticism from a structural standpoint as this joint is very likely to loosen and leak because of the heat to which the tip is subjected, causing unequal expansion and contraction. It is not practical to lower the velocity of the gases by means of a very long tip with the increased friction of gases passing through the long hole as it is difficult, if not impossible, to maintain accuracy in drilling of such long tips. It is impractical to drill from both ends as one of the primary considerations in oxy-acetylene construction is to have no sharp angles or corners against which the mixed gases may come abruptly. If the tip is drilled from both ends, a shoulder where the holes join, is almost certain to occur.

One of the main objects of my invention is to provide a tip having the mixing chamber therein and with the entire passage through the tip drilled or reamed from one end with the desired accuracy and without the liability of excessive drill breakage.

A further object of my invention is to provide a simple, inexpensive, and easily manufactured tip with its mixing chamber and its outlet of the desired relative cross sectional areas and with an intermediate portion which may, if desired, be of larger cross sectional area than either the mixing chamber or the outlet. A further object of my invention is to permit of the inexpensive and accurate forming of the mixing chamber passages in a liner section of softer material than the body of the tip and which liner may, if desired, project from the head end of the tip to aid in forming a seal between the tip and the head.

In the accompanying drawings I have illustrated certain embodiments of my invention but obviously do not desire to be limited to the exact details of construction there shown.

In these drawings:

Figure 1 is a central longitudinal section through the head and tip of the welding torch, the parts being shown on an enlarged or exaggerated scale to facilitate clearness.

Fig. 2 is a transverse section on the line 2—2 of Fig. 1, and

Figs. 3 and 4 are central longitudinal sections through other forms of tips.

In the specific construction shown in Figs. 1 and 2, I have illustrated a head 9, which may be of brass or any other suitable material and having separate passages 10 and 11 leading from supply pipes 12 and 13 through which the combustion supporting gas, such for instance as oxygen, and the combustible gas, such for instance as acetylene, may be delivered. Within the outer end of the head is a seat 14 for the tip. This seat may be flat, conical, or of other form but is preferably a substantially blunt or obtuse angled cone so that when the corresponding head of the tip is forced against the seat there will be little or no wedging action tending to spread or distend the seat. The passage 10 of the head leads to the center of the seat, while the passage 11 leads to an annular groove or distributing passage 15 concentric with the seat and intermediate of the center and periphery of the later. The tip is shown as having a head portion 16 conical to fit or seat within the socket and to engage with the seat at opposite sides of the annular distributing passage 15. The tip has a shoulder 17 against which an inwardly directed flange 18 of the union coupling 19 may engage, the body portion of the coupling being interiorly threaded so as to screw on to the head of the torch and firmly hold the tip to its seat within the socket. So far as thus described, the tip may follow the usual or customary practice. The tip is made of two pieces or parts, one constituting a body portion and the other in the form of a tubular member or liner, the two being fitted together or united to form a unitary structure.

The body portion 20 of the tip is preferably formed of copper, copper alloys, Monel metal, or other material having a high melting point and a high rate of conductivity of heat, and adapted to withstand the high temperatures to which the tip may be subjected.

The tip with the form of seat and holding means illustrated in the drawing or with any other design of seating and retaining means is drilled or reamed to provide the desired passages. In making the tip shown in Fig. 1, I first drill lengthwise into the body of the tip from the seat end a hole 21 which is materially larger than any part of the desired final passage through the tip. For this, a comparatively large and correspondingly strong and stiff drill may be used and accurate positioning of the passage secured. This hole 21 may extend for any desired portion of the distance, for instance, a quarter or a third of the length. From the inner end of the hole 21 I drill a smaller hole 22 through another section of the length of the tip. This hole starting from the center of the inner end of the hole 21 may also be made by the use of a comparatively large drill or may be a reaming operation and may extend toward but not to the extremity or flame outlet end of the tip. It is larger than the desired outlet or the desired mixing chamber and is of the desired diameter to form an expansion chamber as a part of the mixture passage through the tip. From the center of the inner or lower end of the hole 22, I drill a further hole 23 with the small sized drill to serve as the final or outlet passage for the mixture. The size of this drill determines the size of the flame outlet of the tip. This smallest part of the passage is thus drilled for only a short distance and the desired accuracy may be readily obtained and without the high drill breakage. After the drilling of the three sections of the hole, a brass tube or plug 24 is driven or otherwise tightly fitted into the hole portion 21 which serves as a socket, so as to make a tight and permanent fit and form a unitary structure with the body portion. It preferably extends entirely to and abuts against the shoulder at the inner end of the hole 21. Through this tube or plug there is formed the hole 25 which is the mixing passage of the tip and may be of the same size as the outlet 23 from the tip. It should not be materially larger although it may be a little smaller than said outlet. The passage 25 may be formed in a tube before the latter is inserted although preferably a plug is inserted and thereafter drilled or reamed to produce a tube or tubular member. This tubular member being comparatively short in respect to the tip may be easily drilled with the desired small size passage and particularly as it is preferably of a softer material than the body of the tip, as for instance, brass.

The upper or outer end of the passage 25 through the tubular member 24 preferably serves as an oxygen inlet. For admitting acetylene to the mixing passage, passages are drilled through the body of the tip so as to lead from the acetylene passage of the head to the interior of the passage 25. These are shown as passages 26 extending from the annular distributing chamber 15 downwardly and inwardly. Although the length of these passages is ordinarily comparatively short, they are of very much smaller size than the main passage hereinbefore referred to, and correspondingly smaller and more fragile drills must be employed. With the brass lining tube hereinbefore described, it is possible for me to drill the outer portions of the passage 26 with comparatively large drills terminating said outer portions adjacent the outer surface of the tube. From the inner ends of these larger outer portions the small terminal or inlet portions 27 of the passages may be drilled with the desired small size drill through the comparatively soft brass. In carrying out my improved process described and claimed in my patent issued April 15, 1919 on application, Serial No. 227,646 filed April 10, 1918, in which the acetylene is delivered under a little higher pressure than the oxygen and through the diagonal passages to the mixing chamber, the total cross sectional area of the inlet passages 27 is approximately but ordinarily a little less than one half the cross sectional area of the passage 25.

In Fig. 1 I have shown the brass tube 24 having a projection 28, projecting beyond the seat of the tip and into the supply passage 10 of the head. This may be a loose sliding fit in the head although it may aid in forming a seal between the passages 10 and 11 of the head. With the seat between the tip and the head flat instead of conical, the extension 28 may aid in centering the tip.

In Fig. 3 I have shown a tip substantially identical with that shown in Fig. 1, except that the extension 28 is omitted. If an extension be employed, it may be of uniform diameter with the portion of tube within the body, although the tube is preferably of such size that the extension may be turned down to properly fit the passage 10 as shown in Fig. 1. In some tips and particularly for smaller sizes, it is not necessary to provide the expansion chamber intermediate of the ends of the tip. In Fig. 4 I have shown a tip similar to that shown in Fig. 1 except that only two sizes of drills are used in making the central passage. The brass nipple liner or sleeve is the same as shown in Fig. 1 but the passage portion 22ª is of the same diameter as the passage portion 25 forming the mixing chamber and the passage portion 23 forming the flame outlet portion.

Having thus described my invention what I claim as new and desire to secure by Letters Patent is:

1. A two-piece unitary tip for oxy-acetylene burners, having a body portion with a longitudinal bore therethrough provided with an enlarged portion at the base or seat of the tip having a tubular member therein of the tip having a tubular member therein with a gas passage therethrough of uniform diameter and an end portion projecting from said base or seat, the body of the tip at the base or seat portion and the walls of the tubular member being provided with registering gas passages extending to the gas passage through the tubular member.

2. A tip for welding torches, having a body portion with a longitudinal bore therethrough provided with a restricted outlet portion and an enlarged portion at the base or seat of the tip having a tubular member therein with a gas passage therethrough of uniform diameter and of substantially the same diameter as the restricted outlet portion of the bore, the bore being of greater diameter at its middle portion than the outlet portion or the gas passage through the tubular member, to form an expansion chamber, the body of the tip at the base or seat portion and the walls of the tubular member being provided with registering gas passages extending to the gas passage through the tubular member.

3. A two piece unitary tip for welding torches, comprising a body portion formed of a hard high melting point material with a longitudinal hole therethrough, of larger diameter at the seat or base end than at the outlet end, and a member of softer material within the larger portion of the hole and having a passage therethrough of substantially the same size as the outlet from the tip, said tip having a passage for a second gas extending through the body portion and said member and intersecting the first mentioned passage within the latter.

4. A tip for welding torches, including a body portion of a hard high melting point material with a longitudinal hole therethrough of larger diameter at the seat or base end than at the outlet end, and a member of softer material permanently secured within said larger portion and having a passage therethrough of substantially the same size as said outlet, said tip having a second passage extending through the body portion and said member and intersecting the first mentioned passage within said member, and having a portion thereof through the body of the tip of larger diameter than the portion thereof through said member.

5. A cutting or welding torch, including a head having a seat, a passage terminating at the center thereof and a passage terminating in the seat, a detachable tip having a body portion presenting an annular seat for engagement with the seat of the head and having a tubular projection from the center of the seat end of the body and adapted to enter said first mentioned passage of the head and said tip having a central passage therethrough registering with the first mentioned passage of the head and passages extending to said central passage from the seat of the tip for communication with the second mentioned passage of the head, and means independent of said projection for detachably securing said tip to said head.

6. A cutting or welding torch including a member having separate passages therethrough for combustion and combustion supporting gases and presenting a conical seat, one of said passages being co-axial with said seat and terminating at the inner or apex end thereof, and a removable tip including a body portion presenting a conical end adapted to engage in and fit said seat, a socket co-axial with said last mentioned passage, and a tubular member carried by the body portion co-axial with the conical end of the latter and having one end tightly fitting within said socket, and the other end constituting a cylindrical extension adapted to telescope into and fit the terminal portion of said last mentioned passage upon the bringing of said conical end into engagement with said seat, said tubular member and body portion having registering axial passages for the delivery of mixed combustion and combustion supporting gases.

7. A tip for welding torches, including a body portion of hard material with a longitudinal hole therethrough, the portion of said hole at the base or seat end of the tip being comparatively large to form a socket and the final or outlet portion being smaller and a member of comparatively softer material secured within said socket to form a unitary structure with said body portion, and having a longitudinal passage therethrough of uniform diameter throughout, and of substantially the same diameter as the outlet from the tip.

8. A two-piece unitary tip for welding torches, including a member having a passage therethrough, one end portion serving as an oxygen inlet and the other end portion serving as a mixing chamber and diagonal passages intersecting said first mentioned passage intermediate of its ends and serving as combustible gas inlets, said diagonal passages being of materially less total cross sectional area than said longitudinal passage, and a body portion having a socket in one end carrying said member, a mixture outlet passage registering with the first mentioned passage of said member, and diagonal passages registering with the diagonal passages of said member.

Signed at New York city, in the county of New York and State of New York, this 17th day of January, A. D. 1919.

MELBOURNE KEITH DUNHAM.